United States Patent
Peterson

(10) Patent No.: US 11,066,113 B2
(45) Date of Patent: Jul. 20, 2021

(54) GALVANIZED WIRE PLY FOR RUBBER TRACK

(71) Applicant: ContiTech Transportbandsysteme GmbH, Hannover (DE)

(72) Inventor: Paul John Peterson, Cuyahoga Falls, OH (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 465 days.

(21) Appl. No.: 15/975,817

(22) Filed: May 10, 2018

(65) Prior Publication Data

US 2019/0344841 A1 Nov. 14, 2019

(51) Int. Cl.
*B62D 55/24* (2006.01)
*B62D 55/253* (2006.01)

(52) U.S. Cl.
CPC ......... *B62D 55/244* (2013.01); *B62D 55/242* (2013.01); *B62D 55/253* (2013.01)

(58) Field of Classification Search
CPC .... B62D 55/244; B62D 55/24; B62D 55/253; B62D 55/242
See application file for complete search history.

(56) References Cited

U.S. PATENT DOCUMENTS

| | | | |
|---|---|---|---|
| 4,721,498 A * | 1/1988 | Grob | F16G 1/08 474/261 |
| 5,131,215 A | 7/1992 | Williames | |
| 5,211,609 A * | 5/1993 | Haines | B62D 55/244 474/260 |
| 6,372,071 B1 | 4/2002 | Garro et al. | |
| 6,764,143 B2 | 7/2004 | Peterson | |
| 7,048,343 B2 | 5/2006 | Peterson | |

(Continued)

FOREIGN PATENT DOCUMENTS

| | | |
|---|---|---|
| EP | 0492708 A1 | 7/1992 |
| EP | 1361142 A2 | 11/2003 |

(Continued)

OTHER PUBLICATIONS

International Search Report of PCT application PCT/EP2019/058138 dated Jul. 18, 2019 claiming priority this application.

*Primary Examiner* — Scott A Browne
(74) *Attorney, Agent, or Firm* — Gregory Adams; David L. Cate

(57) ABSTRACT

Endless elastomeric tracks include guide lugs disposed on an inner circumference, rubber tread lugs disposed on an outer circumference, and a thin band continuously extending in the circumferential direction which is disposed adjacent the outer circumference. The thin band has an exterior peripheral surface and an inner peripheral surface, and at least one galvanized wire ply is disposed between the exterior peripheral surface and an inner peripheral surface. The endless track further includes at least one primary cable of galvanized steel circumferentially reinforcing the thin band. In some aspects, the at least one galvanized wire ply includes a plurality of galvanized wires having a diameter of from about 0.15 mm to about 1.5 mm, from about 0.175 mm to about 1.3 mm, from about 0.20 mm to about 1.25 mm, from about 0.22 mm to about 1.2 mm, or even from about 0.25 mm to about 1.1 mm.

11 Claims, 3 Drawing Sheets

(56) References Cited

U.S. PATENT DOCUMENTS

| | | | | |
|---|---|---|---|---|
| 7,641,292 B2* | 1/2010 | Matsuo | B62D 55/244 | 305/166 |
| 7,823,988 B2* | 11/2010 | Song | B62D 55/244 | 305/170 |
| 8,083,297 B2* | 12/2011 | Fujita | B62D 55/14 | 305/170 |
| 8,191,976 B2* | 6/2012 | Sugihara | B62D 55/253 | 305/167 |
| 9,216,784 B2* | 12/2015 | Hagio | B62D 55/24 | |
| 9,359,026 B2* | 6/2016 | Mizusawa | B62D 55/242 | |
| 9,432,429 B1* | 8/2016 | Ho | H04N 21/4302 | |
| 2002/0067074 A1* | 6/2002 | Katayama | B62D 55/244 | 305/170 |
| 2002/0195877 A1* | 12/2002 | Tsuru | B62D 55/244 | 305/170 |
| 2003/0015917 A1 | 1/2003 | Yovichin | | |
| 2003/0080618 A1* | 5/2003 | Krishnan | C08L 2666/08 | 305/165 |
| 2003/0094854 A1* | 5/2003 | Rodgers | B62D 55/244 | 305/166 |
| 2004/0029669 A1* | 2/2004 | Phely | D07B 1/0613 | 474/202 |
| 2004/0235600 A1* | 11/2004 | Piou | B62D 55/244 | 474/262 |
| 2007/0046100 A1 | 3/2007 | McGilvrey | | |
| 2008/0136255 A1 | 6/2008 | Feldmann | | |
| 2009/0079260 A1* | 3/2009 | Song | B62D 55/244 | 305/170 |
| 2009/0206655 A1* | 8/2009 | Song | B62D 55/244 | 305/169 |
| 2011/0037313 A1 | 2/2011 | Delisle et al. | | |
| 2011/0121644 A1 | 5/2011 | Wellman | | |

FOREIGN PATENT DOCUMENTS

| | | |
|---|---|---|
| JP | H09279493 A | 10/1997 |
| JP | H1121389 A | 1/1999 |

* cited by examiner

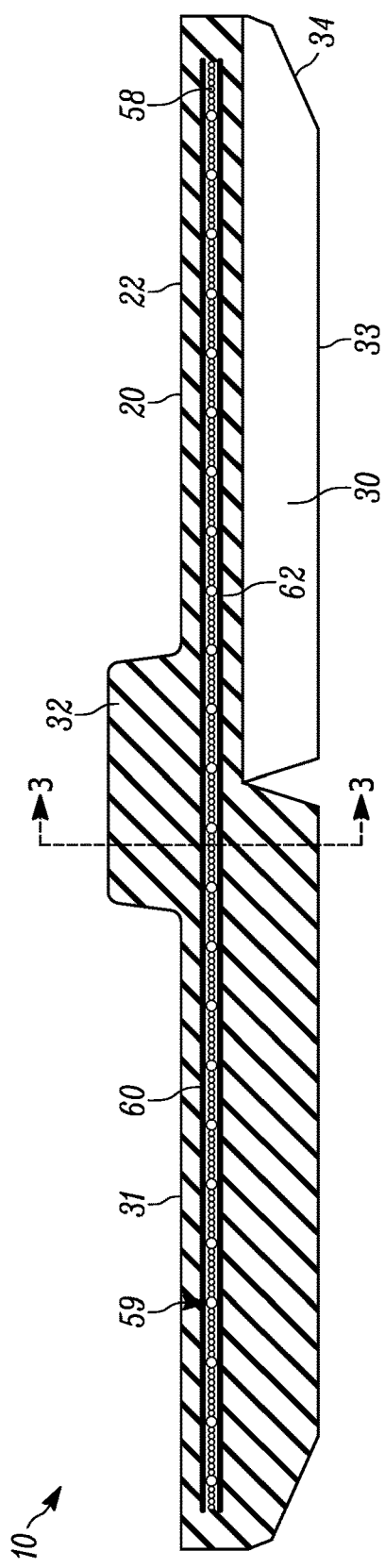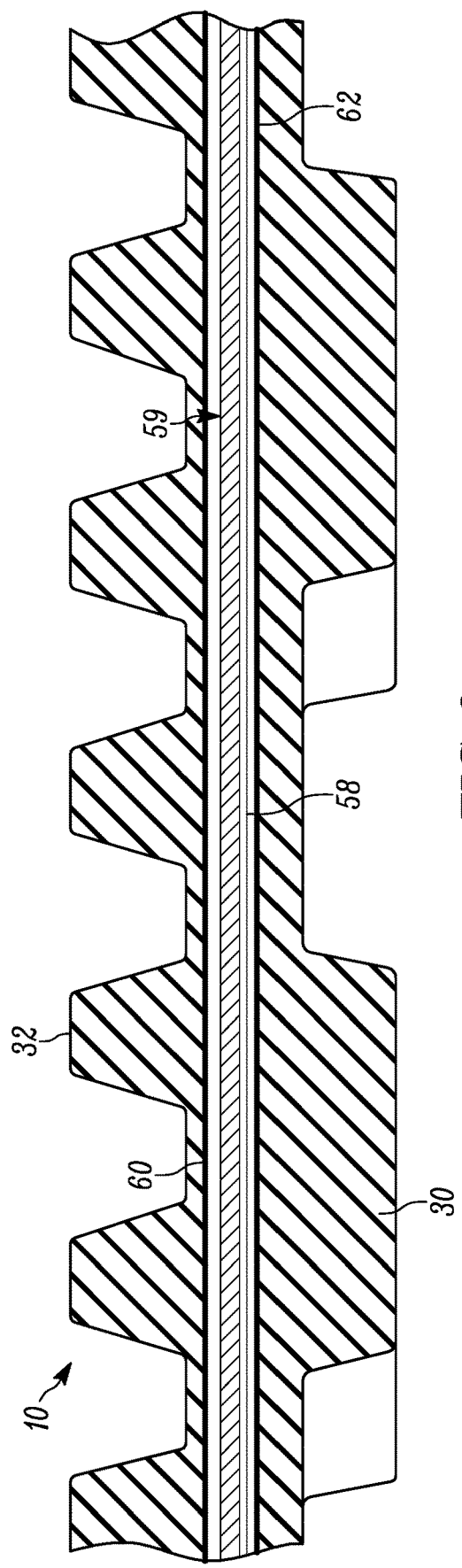

GALVANIZED WIRE PLY FOR RUBBER TRACK

FIELD

The field to which the disclosure generally relates is vehicle tracks, and more particularly to vehicle tracks having reinforcement and/or ply layer(s) within the carcass of the tracks.

BACKGROUND

This section provides background information to facilitate a better understanding of the various aspects of the disclosure. It should be understood that the statements in this section of this document are to be read in this light, and not as admissions of prior art.

Positive guide-drive, endless rubber tracks, such as those used on agricultural, construction or industrial vehicles, typically include a continuous carcass, tread lugs disposed on the outer circumference of the carcass, and an internal, center row of individual guide-drive lugs which engage guide-drive bars on a guide-drive wheel. The carcass is generally an endless rubber belt reinforced with continuous flexible steel cables bonded into the rubber, which functions as a reinforcing structure.

The belt reinforcing structure of a track typically has a plurality of primary cables, longitudinally orientated along the circumferential direction of the track. Some rubber tracks, especially those used in demanding service applications, utilize one or more wire plies to stiffen the track and protect the cables from damage. Commonly, the wire used as a reinforcing or breaker ply in rubber tracks is typically of a brass coated steel construction. The brass is used to promote adhesion to the wire and also facilitates drawing the filaments during the wire manufacturing process.

The entire belt structure must be very flexible and therefore is designed to be thin in cross-sectional thickness. This thin structure is sometimes cut by debris trapped internally or cut by simply driving over debris such as concrete rubble, steel or trash found at typical construction sites or in fields. Once the belt is sufficiently cut, the brass coated steel wires may become susceptible to corrosion when exposed to water, which ultimately can result in localized failure of the wire ply or plies.

Thus, there is an ongoing need for endless tracks for industrial, construction or agricultural vehicles with improved wire ply or plies providing increased durability under severe conditions, such need met, at least in part, with embodiments according to the following disclosure.

SUMMARY

This section provides a general summary of the disclosure, and is not a necessarily a comprehensive disclosure of its full scope or all of its features.

In some aspects of the disclosure, an endless elastomeric track includes guide lugs disposed on an inner circumference, rubber tread lugs disposed on an outer circumference, and a thin band continuously extending in the circumferential direction which is disposed adjacent the outer circumference. The thin band has an exterior peripheral surface and an inner peripheral surface, and at least one galvanized wire ply is disposed between the exterior peripheral surface and an inner peripheral surface. The endless track further includes at least one primary cable of galvanized steel circumferentially reinforcing the thin band. In some cases, the at least one primary cable is helically wound forming a reinforced layer extending across the track from a first end on a first side of the track to a second end on an opposite side of the track.

In some aspects, the at least one galvanized wire is two galvanized wire plies disposed between the exterior peripheral surface and an inner peripheral surface. The two galvanized wire plies may or may not be cross-plies.

The thin band may further include a reinforcement layer, which also may be a galvanized wire ply, or alternatively, a fabric reinforcement ply. In some other embodiments, the reinforcement layer may be disposed adjacent the at least one primary cable on an opposing side, from the at least one galvanized wire ply, of the at least one primary cable, and such a reinforcement layer may be a galvanized wire ply, or alternatively, a fabric reinforcement ply.

In some aspects, the thin band of the endless elastomeric track is an elastomeric rubber mixture encapsulating the at least one galvanized wire ply and the at least one primary cable, the elastomeric rubber mixture composition comprised of (based upon 100 parts by weight elastomers (phr)):

(A) elastomers comprised of 20-100 phr isoprene rubber and correspondingly, zero to 80 phr of styrene/butadiene rubber;
(B) 30 to 70 phr of reinforcing filler selected from rubber reinforcing carbon black and silica comprised of 20 to 70 phr of said carbon black and from zero to 40 phr silica;
(C) calcined litharge from 2 to 5 phr;
(D) sulfur from 2 to 5 phr; and,
(E) zinc oxide from 3 to 9 phr.

In some aspects, the at least one galvanized wire ply includes a plurality of galvanized wires having a diameter of from about 0.15 mm to about 1.5 mm, from about 0.175 mm to about 1.3 mm, from about 0.20 mm to about 1.25 mm, from about 0.22 mm to about 1.2 mm, or even from about 0.25 mm to about 1.1 mm. Also, the galvanized steel wire filaments may be used as an individual element or is elements in a strand or cord. Where used in a strand or cord, a plurality of filaments are twisted together to form a strand, and also, several strands may be twisted together to form a cord.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 2 is a cross-sectional view of the track taken along lines 2-2 of FIG. 1;

FIG. 3 is a cross-sectional view of the track taken along lines 3-3 of FIG. 2; and, FIG. 4 shows a portion of, in a perspective cut away view, another completed rubber track, 100, according to some aspects of the disclosure.

DETAILED DESCRIPTION

Figure 1:
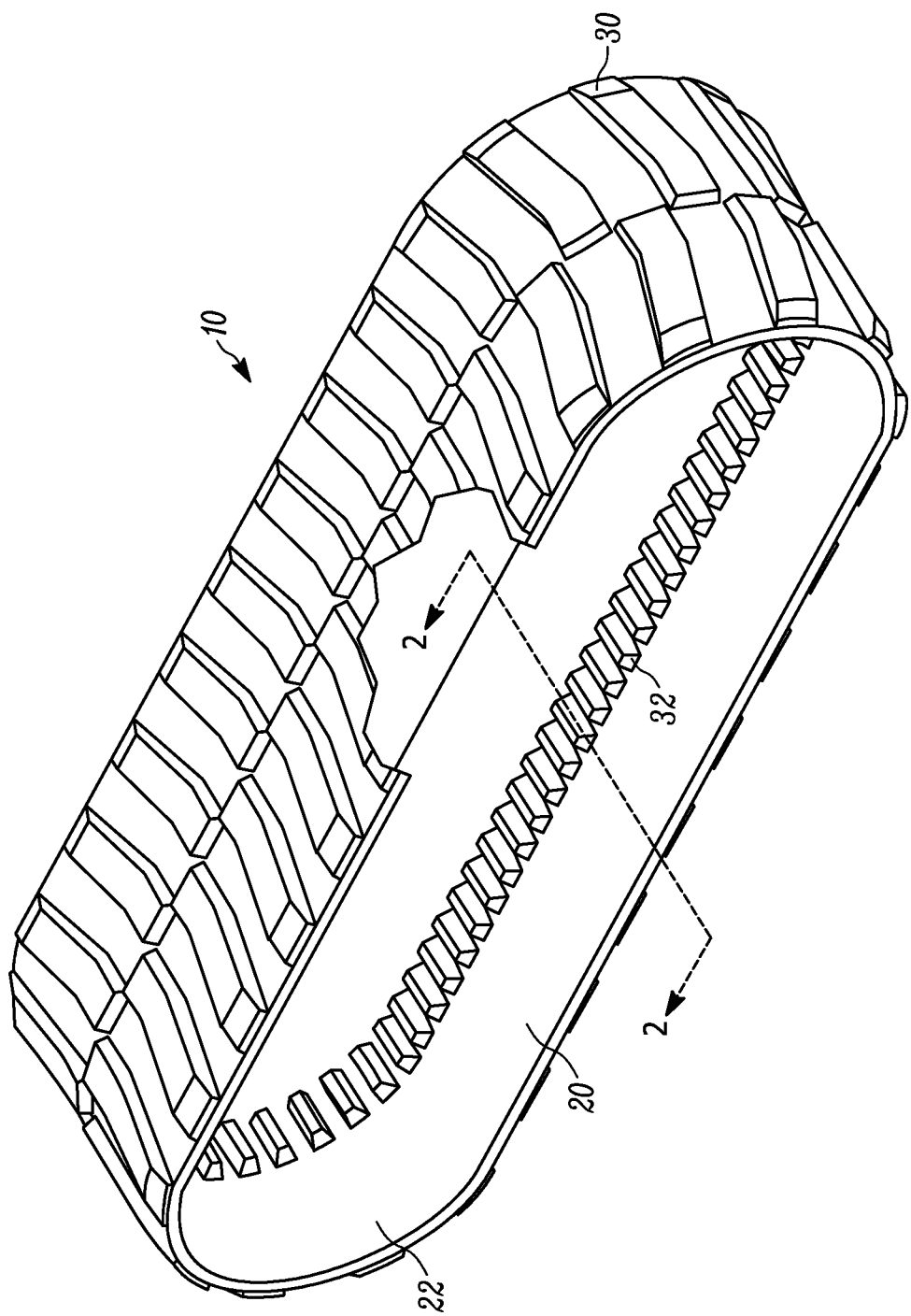
FIG. 1 is a perspective view showing a completed rubber track in accordance with the disclosure.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Embodiments according to the disclosure are endless rubber tracks, such as those used on agricultural, construction or industrial vehicles, which include a continuous carcass, ground engaging tread lugs disposed on the outer circumference of the carcass, and an internal, center row of individual guide-drive lugs which engage guide-drive bars on a positive guide-drive wheel. The carcass is an endless rubber belt reinforced with continuous flexible steel cables bonded into the rubber, which functions as a reinforcing structure. The flexible steel cables are longitudinally orientated along the circumferential direction of the track. While any suitable continuous flexible steel cables may be used in accordance with the disclosure, some non-limiting examples include those cable described in U.S. Pat. No. 6,764,143, the disclosure of which is incorporated herein by reference thereto. Furthermore, one or more galvanized wire plies are disposed adjacent the flexible steel cables to stiffen the track and protect the cables from damage.

The wires used in the one or more galvanized wire plies are of a hot dipped galvanized coated steel construction. Such galvanized wires provide electrochemical protection to resist corrosion of the steel wire filaments when exposed to water after the surface of the track is cut by debris trapped internally or cut by driving over debris such as concrete rubble, steel or trash. When exposed to the atmosphere, the pure zinc (Zn), coated onto the steel wire during galvanization, reacts with oxygen ($O_2$) to form zinc oxide (ZnO), which further reacts with carbon dioxide ($CO_2$) to form zinc carbonate ($ZnCO_3$), a usually dull grey, fairly strong material that protects the steel underneath from further corrosion in many circumstances. Such galvanizing protects steel by acting as a barrier between steel and the atmosphere.

The one or more wire plies may be formed of individual galvanized steel wire filaments which are calendered in a rubbery material, or filaments combined in a galvanized steel wire rope design which are calendered in a rubbery material. Any suitable wire size may be used. Some exemplary wire diameter sizes include, but are not limited to, 0.15 mm to about 1.5 mm, from about 0.175 mm to about 1.3 mm, from about 0.20 mm to about 1.25 mm, from about 0.22 mm to about 1.2 mm, or even from about 0.25 mm to about 1.1 mm. In an embodiment of the disclosure, the wire diameter size is about 1.09 mm. The galvanized steel wire filaments may be used as an individual element or is elements in a strand or cord. Where used in a strand or cord, a plurality of filaments are twisted together to form a strand, and also, several strands may be twisted together to form a cord.

Referring to the drawings, in FIG. 1 there is shown a completed rubber track 10 according to the disclosure. This track 10 has a plurality of tread lugs 30 extending from each side of the lateral edges of the track towards the middle of the track. These lugs are designed somewhat similar to the lugs found on tractor tires. Such a track has an endless band 20 formed of rubber 22, the rubber 22 calendered to encapsulate breaker the plies and cable. It will be understood that such a track is adapted to be positioned upon the wheels, rollers, or tires (not shown) of a motorized vehicle, such as a tractor, or the like, to support the vehicle for movement along a desired surface such as an agricultural field. The exterior peripheral surface of the band 20 is formed with integral tread lugs 30. The center portion of the inner peripheral surface of band 20 is formed with a plurality of conventional drive or guide lugs 32 which can engage complimentary sprockets (not shown) on the wheels or rollers of the drive vehicle which is supported by the track. With reference to FIGS. 1 through 3, a track according to an aspect of the disclosure is depicted.

As shown in FIGS. 2 and 3, the band 20 may have a plurality of metallic or steel cables (i.e. galvanized cables) for reinforcement shown as 59 and 58 in the drawing encapsulated in rubber 22. The drive lugs 32 are shown in the central portion of the track 10 on its inner peripheral surface 31. The tread lugs 30 extend outward from the tread band 20 to an outer surface 33. Each tread lug 30 has a leading edge and a trailing edge as illustrated in FIG. 1 of the drawings. The distance between the leading edges and the trailing edges defines the lug width. The band 20 further includes one or more wire plies (two shown as 60 and 62), disposed adjacent the plurality of metallic or steel cables. The galvanized steel wires contained within wire plies 60 and 62 may be orientated in any suitable orientation relative the longitudinal direction of the belt, such as an angle of 0 degrees (parallel), offset 90 degrees (transverse), any suitable bias angle between 0 degrees and 90 degrees, or combinations thereof. Further, separate wire plies may have galvanized steel wires orientated in like angles in some cases, while in other cases, separate wire plies may have galvanized steel wires orientated in dissimilar angles.

In some embodiments, the thin band 20 may have belt wire plies having two or more cross plies reinforced by cords 58, the cords 58 being inclined at a bias angle relative to the circumferential direction, each layer being oppositely oriented. This cross ply structure provides lateral stability to the track 10. Alternatively, one or more of the cross plies can have cords oriented at 90° relative to circumferential direction. The cords 58 are preferably steel. The cords 58 may be zinc coated or zinc in combination with other metals such as cobalt or nickel forming a galvanized steel cross ply structure.

The thin band 20 further may have at least one primary cable 59 that extends circumferentially along the length of the track 10. If one such cable 59 can be used then the cable may have a first end located near a first lateral end or side of the track 10 and the cable 59 can be helically wound numerous times to form a single layer of helically wound cable 59 that terminates at a second end on or near an opposite second lateral end or side of the track 10. Alternatively, the primary cable 59 may include several cables 59 circumferentially extending thus having multiple ends. The cable 59 may be a spliced belt of circumferentially extending cables 59. The cable 59, preferably, is spaced at 10 ends per inch or less across the width of the track.

Figure 4:
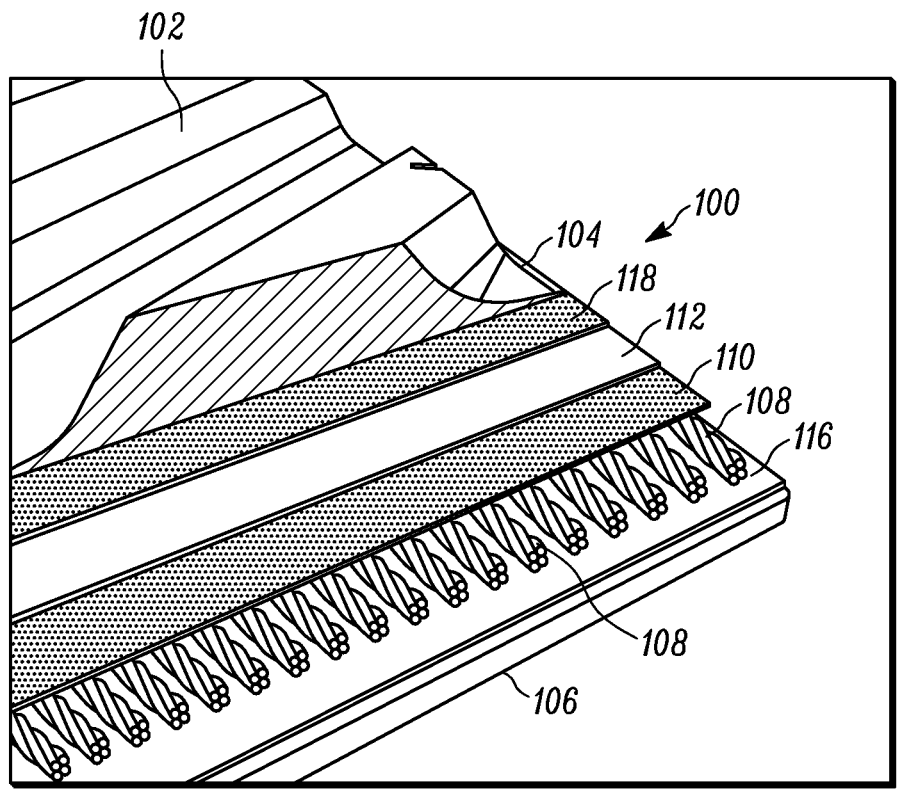

Now with reference to FIG. 4, illustrating rubber track 100, which includes a continuous carcass (as described above), ground engaging tread lugs 102 disposed on the outer circumference 104 of the carcass, and an internal, center row of individual guide-drive lugs (not shown) disposed on the inner circumference 106 which engage guide-drive bars on a positive guide-drive wheel. The carcass is reinforced with continuous flexible steel cables 108 bonded into the rubber. The flexible steel cables 108 are longitudinally orientated along the circumferential direction of the track. Furthermore, galvanized wire plies, 110 and 112, are disposed adjacent the flexible steel cables 108 to stiffen the track and protect the cables from damage. In some aspects, rubber track 100 may include further reinforcement layers, such as 116 and 118, which may be galvanized wire plies or other fabric reinforcement layers.

While the above embodiments are described in the context of endless vehicle tracks, it is within the scope and spirit of the disclosure to apply the inventive concept to other rubber based articles having longitudinal cables, such as, but not limited to, steel cable reinforced conveyor belts, power transmission belts, and the like.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

LIST OF REFERENCE NUMERALS (PART OF THE SPECIFICATION)

10 Endless elastomeric track
20 Endless band
22 Rubber
30 Tread lugs
31 Inner peripheral surface
32 Drive or guide lugs
33 Outer surface
58 Reinforcement
59 Reinforcement
60 Galvanized wire ply
62 Galvanized wire ply
100 Endless elastomeric track
102 Ground engaging tread lugs
104 Outer circumference
106 Inner circumference
108 Steel cables
110 Galvanized wire ply 112 Galvanized wire ply
114 Reinforcement layer
116 Reinforcement layer
118 Reinforcement layer

What is claimed is:

1. An endless elastomeric track comprising:
rubber tread lugs disposed on an outer circumference of a rubber carcass,
the carcass surrounds a reinforcement, the reinforcement having a first side and a second side,
the first side being the side of the track with the tread lugs and the second side being the side of the track opposite the first side;
the reinforcement comprises:
a layer formed within the carcass and comprising a plurality of galvanized steel cables, wherein the plurality of galvanized steel cables are longitudinally oriented along the circumferential direction of the track,
the plurality of cables comprising a helically wound primary cable,
the primary cable being a zinc-coated wire bundle having a ((3×0.35 mm)+(6×0.63 mm)+(6×0.63 mm)+(6×0.57 mm)) construction;
a first galvanized wire ply formed within the carcass defining the first side of the reinforcement and disposed on a first side of the layer to stiffen the track and protect the plurality of cables from damage,
the first galvanized ply comprising a plurality of individual galvanized wire filaments calendered in a rubbery material;
a second galvanized wire ply formed within the carcass defining the second side of the reinforcement and disposed on a second side of the layer and comprising a second plurality of individual galvanized wire filaments calendered in a rubbery material oriented in dissimilar angles from the first galvanized wire ply; and
the layer, the first galvanized wire ply, and the second galvanized wire ply have substantially the same transverse width.

2. The endless elastomeric track of claim 1, wherein the two galvanized wire plies are cross-plies.

3. The endless elastomeric track of claim 2, wherein the at least one primary cable has a 5.3 mm diameter.

4. The endless elastomeric track of claim 1, wherein the at least one primary cable is spaced at 10 ends per inch or less when viewed in a cross section taken across the width of the track.

5. The endless elastomeric track of claim 1, wherein the carcass includes an elastomeric rubber mixture composition comprised of, based upon 100 parts by weight elastomers (phr),
(A) Elastomers comprised of 20-100 phr isoprene rubber and correspondingly, zero to 80 phr of styrene/butadiene rubber;
(B) 30 to 70 phr of reinforcing filler selected from rubber reinforcing carbon black and silica comprised of 20 to 70 phr of said carbon black and from zero to 40 phr silica;
(C) Calcined litharge from 2 to 5 phr;
(D) Sulfur from 2 to 5 phr; and,
(E) Zinc oxide from 3 to 9 phr.

6. The endless elastomeric track of claim 1, wherein the wire filaments of the second galvanized wire ply have a diameter of from 0.15 mm to 1.5 mm.

7. The endless elastomeric track of claim 6, wherein the wire filaments of the second galvanized wire ply have a diameter of from 0.175 mm to 1.3 mm.

8. The endless elastomeric track of claim 7, wherein the wire filaments of the second galvanized wire ply have a diameter of from 0.20 mm to 1.25 mm.

9. The endless elastomeric track of claim 8, wherein the wire filaments of the second galvanized wire ply have a diameter of from 0.22 mm to 1.2 mm.

10. The endless elastomeric track of claim 1, wherein the wire filaments are incorporated as individual elements.

11. The endless elastomeric track of claim 1, wherein the wire filaments are incorporated as elements in a strand or cord.

* * * * *